US005437259A

United States Patent [19]

Hamada et al.

[11] Patent Number: 5,437,259

[45] Date of Patent: Aug. 1, 1995

[54] INTERNAL-COMBUSTION-ENGINE IGNITION DEVICE

[75] Inventors: Kazuya Hamada; Shigemi Murata, both of Himeji, Japan

[73] Assignee: Mitsubishi Denki Kabushiki Kaisha, Tokyo, Japan

[21] Appl. No.: 273,983

[22] Filed: Jul. 12, 1994

Related U.S. Application Data

[62] Division of Ser. No. 70,798, Jun. 3, 1993, Pat. No. 5,377,653.

[30] Foreign Application Priority Data

Jun. 5, 1992 [JP] Japan .................................. 4-145695
Jun. 5, 1992 [JP] Japan .................................. 4-145696

[51] Int. Cl.[6] ........................ F02P 17/12; G01M 15/00

[52] U.S. Cl. .................................... 123/630; 123/634; 73/117.3; 324/399

[58] Field of Search ............... 123/425, 630, 655, 634, 123/635; 73/116, 117.3; 324/456, 378, 388, 390, 391, 392, 393, 399

[56] References Cited

U.S. PATENT DOCUMENTS

| | | | |
|---|---|---|---|
| 5,144,936 | 9/1992 | Murata et al. | 123/655 |
| 5,178,001 | 1/1993 | Ikeuchi et al. | 73/117.3 |
| 5,180,984 | 1/1993 | Murata et al. | 324/399 |
| 5,230,240 | 7/1993 | Ohsawa et al. | 73/116 |

FOREIGN PATENT DOCUMENTS

| | | |
|---|---|---|
| 4015191 | 11/1990 | Germany . |
| 4132124 | 4/1992 | Germany . |
| 4133775 | 4/1992 | Germany . |
| 4138823 | 5/1992 | Germany . |
| 88267 | 6/1982 | Japan . |

*Primary Examiner*—Willis R. Wolfe
*Attorney, Agent, or Firm*—Sughrue, Mion, Zinn, Macpeak and Seas

[57] ABSTRACT

An internal-combustion-engine ignition device in which such components as the ion-current-detection unit are provided integrally with other ignition-device components to realize a simplified structure, thereby helping to attain a reduction in cost and an improvement in terms of layout and reliability, the internal-combustion-engine ignition device including: a distributor cap having a central electrode connected to an ignition coil, a plurality of peripheral electrodes respectively connected to the ignition plugs of cylinders and adapted to be selectively connected to the central electrode, and diodes each connected at one end to the peripheral electrodes and at the other end to the central electrode, the distributor cap having openings lodging the diodes for detecting an ion current generated upon combustion of air-fuel mixture inside the cylinders, caused by ignition of the ignition plugs. An ion-current-detection unit may be arranged integrally with the distributor cap, distributor housing, ignition coil, or engine-turning-angle detecting device.

1 Claim, 10 Drawing Sheets

FIG. 10
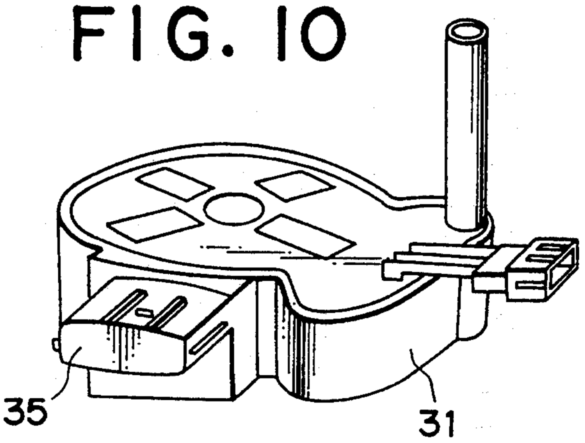
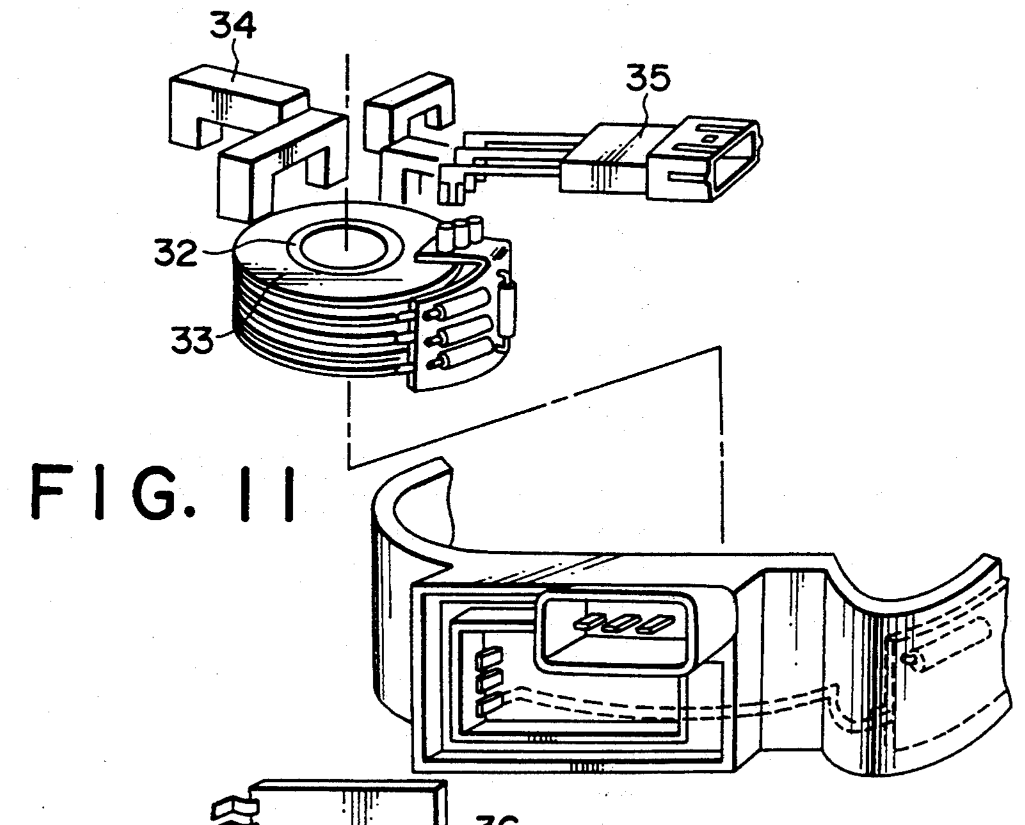
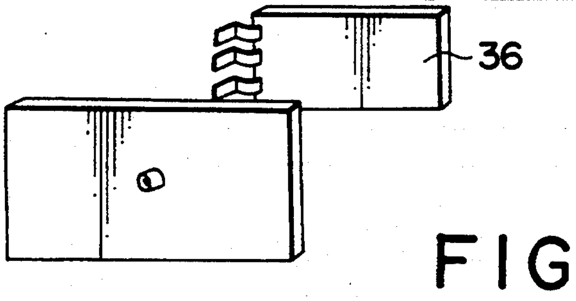
FIG. 11
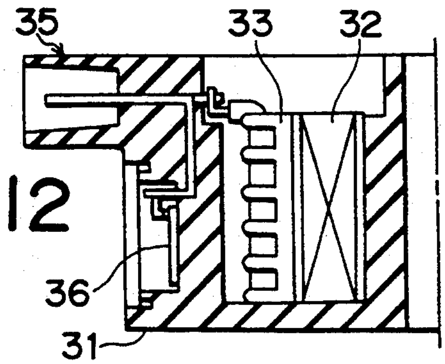
FIG. 12

INTERNAL-COMBUSTION-ENGINE IGNITION DEVICE

This is a divisional of application Ser. No. 08/070,798 filed Jun. 3, 1993, now U.S. Pat. No. 5,377,653.

BACKGROUND OF THE INVENTION

1. Field of the Invention

This invention relates to an internal-combustion-engine ignition device and, in particular, to an internal-combustion-engine ignition device equipped with an ion-current-detection-diode assembly and an ion-current-detection unit for detecting ion current generated in the associated cylinders.

DESCRIPTION OF THE RELATED ART

FIG. 17 shows the construction of a conventional internal-combustion-engine ignition device. In the drawing, numeral 1 indicates an ignition coil including primary and secondary windings 1*a* and 1*b;* numeral 2 indicates a power transistor connected to the primary winding la and adapted to conduct/interrupt primary current; numeral 3 indicates a distributor cap including a central electrode 3*a* connected to the negative-polarity side of the secondary winding 1*b,* and peripheral electrodes 3*b* which face each other in turn through gaps as a distributor rotor 14 rotates, which rotor is in contact with the central electrode 3*a;* numeral 4 indicates ignition plugs respectively connected to the peripheral electrodes 3*b;* numeral 5 indicates a power source constituting a bias means for applying positive bias voltage to the ignition plugs 4; numeral 6 indicates a resistor connected in series to the power source 5 and serving to convert ion current to voltage; and numeral 7 indicates an output terminal for detecting the voltage generated at the resistor 6, the output terminal 7 constituting, together with the resistor 6, an ion-current detection unit 12. Numeral 8 indicates diodes for obstructing reverse current; and numeral 9 indicates signal-take-out-diode assemblies including the diodes 8, the diode assemblies being arranged on the outside of the distributor cap 3 in the same number as the cylinders. Numeral 10 indicates an engine, in the upper section of which the ignition plugs 4 are mounted; numeral 11 indicates a signal generator for detecting the turning angle of the engine 10; and numeral 13 indicates a computer unit for controlling the ignition timing, etc., to which computer unit the output of the ion-current detection unit 12 is supplied.

Next, the operation of this conventional internal-combustion-engine ignition device, shown in FIG. 17, will be described. When the power transistor 2 is turned off to interrupt the primary current of the primary winding 1*a,* high voltage for ignition is generated in the secondary winding 1*b* and applied to the central electrode 3*a.* This high voltage for ignition, applied to the central electrode 3*a,* is propagated through the distributor rotor 14 and the gaps to the opposed electrodes 3*b* and, further, to the ignition plugs 4 to cause discharge between the electrodes thereof, thereby igniting and burning the air-fuel mixture in the cylinders (The current path in this connection is indicated by an arrow a).

With the combustion of the air-fuel mixture, ionization occurs to generate ions. After the above-mentioned discharge, the electrodes of the ignition plugs 4 function as ion-current-detection electrodes, and positive-polarity bias voltage of the power source 5 causes migration of electrons and positive ions, thereby generating an ion current. The generation of this ion current enables the voltage generated at the output terminal 7 to be detected, thereby making it possible to confirm the burning of the air-fuel mixture (The current path in this connection is indicated by an arrow b).

In this conventional internal-combustion-engine ignition device, constructed as described above, it is necessary to provide an independent diode assembly 9, including the ion-current-detection diode 8, for each cylinder. Further, the ion-current-detection unit 12 is arranged independently from the other components, such as the ignition coil and turning-angle detection unit, resulting in a complicated ignition-device structure and high cost. In addition, there is the necessity to ensure the space for the diode assemblies 9 and the ion-current-detection unit 12, resulting in difficulties in terms of layout inside the engine room, which, nowadays, is usually rather small. Further, this conventional structure involves a large number of parts and is rather poor in reliability.

SUMMARY OF THE INVENTION

This invention has been made with a view toward solving the problems in the prior art as described above. It is the object of this invention to provide an internal-combustion-engine ignition device in which the diode assemblies and the ion-current-detection unit are formed integrally with the other device components, thereby simplifying the structure, reducing the cost, facilitating the layout, and attaining high reliability.

In an internal-combustion-engine ignition device according to this invention, a diode is arranged in each of openings formed in a distributor cap and is embedded in resin with which the opening is filled.

Further, in an internal-combustion-engine ignition device according to this invention, diodes, which respectively correspond to the associated cylinders, are connected to inserts beforehand, and form, together with a central electrode and peripheral electrodes, a pre-mold through primary molding using thermosetting resin, the pre-mold being formed into a distributor cap by final molding.

Further, in accordance with this invention, there is provided an internal-combustion-engine ignition device wherein diodes, which respectively correspond to the associated cylinders, are connected to inserts beforehand, and form, together with a central electrode and peripheral electrodes, a pre-mold by primary molding using thermosetting resin, the pre-mold having a current leakage preventing means on its surface and being formed into a distributor cap by final molding.

Further, in an internal-combustion-engine ignition device according to this invention, an ion-current-detection unit is attached to an ignition coil, a distributor cap, an angle-detection unit or a distributor housing.

In accordance with this invention, the diodes for detecting ion current are provided inside the distributor cap, so that a diode assembly need not be provided for each associated cylinder and can be eliminated. Further, in this invention, the ion-current-detection unit is arranged integrally with another ignition-device component, thereby making the internal-combustion-engine ignition device as a whole more compact.

BRIEF DESCRIPTION OF THE DRAWINGS

FIG. 10 is a perspective view of a structure according to another embodiment of this invention in which an ion-current-detection unit is arranged integrally with an ignition coil;

FIG. 11 is an exploded perspective view of the ignition coil of FIG. 10;

FIG. 12 is a sectional view of the ignition coil of FIG. 10;

DESCRIPTION OF THE PREFERRED EMBODIMENTS

Figure 1:
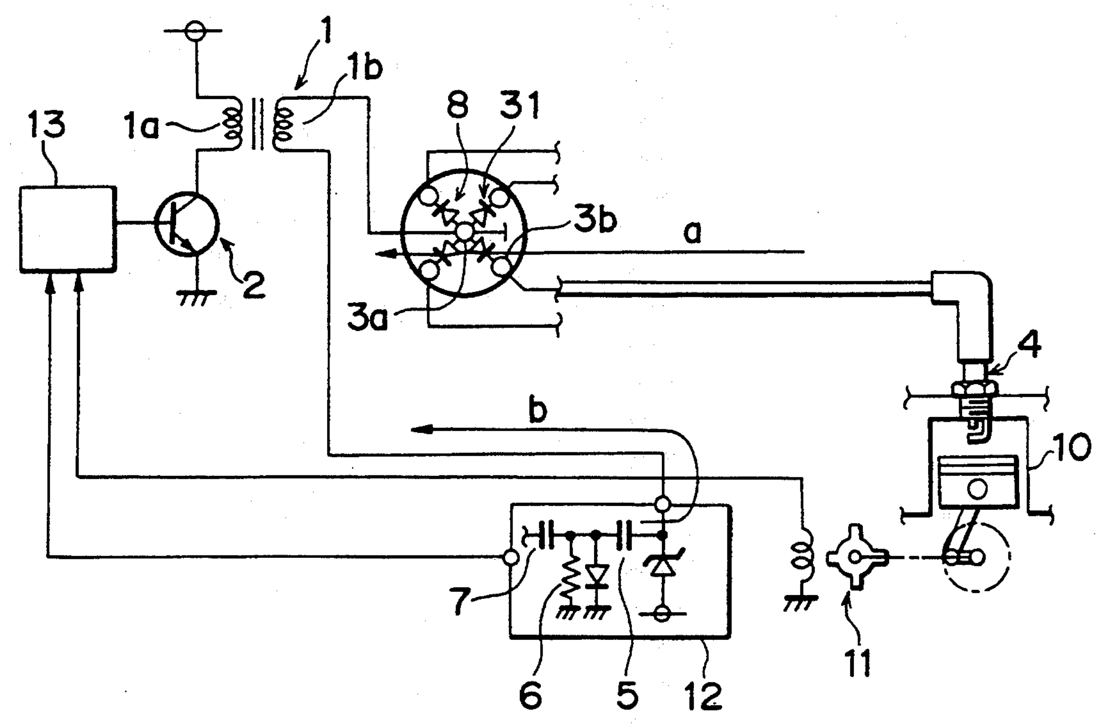
FIG. 1 is a block diagram showing a construction according to an embodiment of this invention in which ion-current-detection diodes are arranged in a distributor cap.
Figure 2:
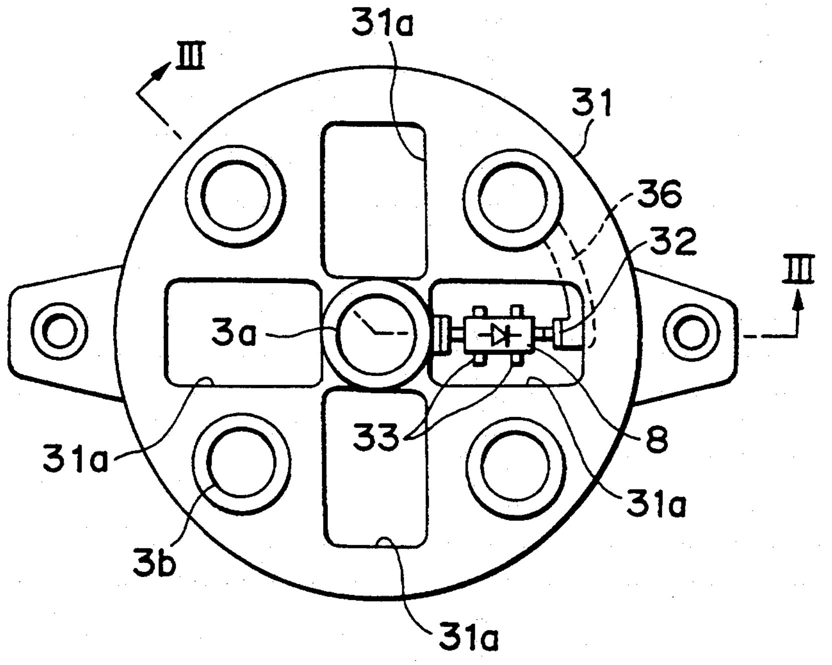
FIG. 2 is a plan view of a distributor cap according to an embodiment of this invention.
Figure 3:
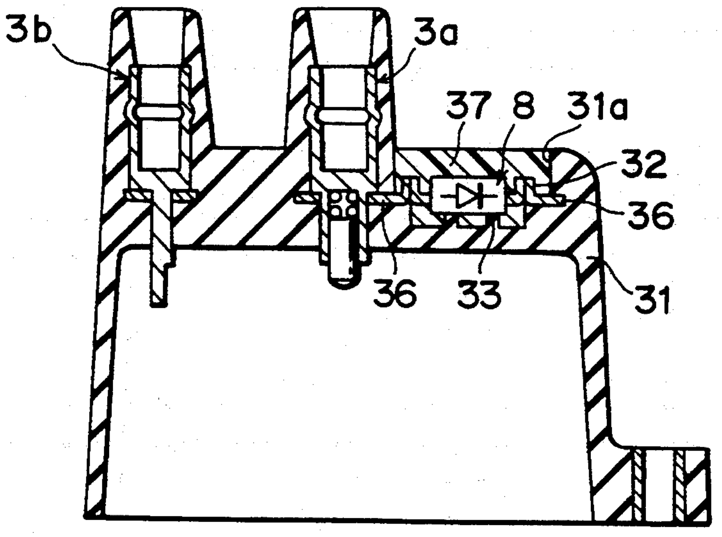
FIG. 3 is a sectional view taken along line III—III of FIG. 2.
Figure 17:
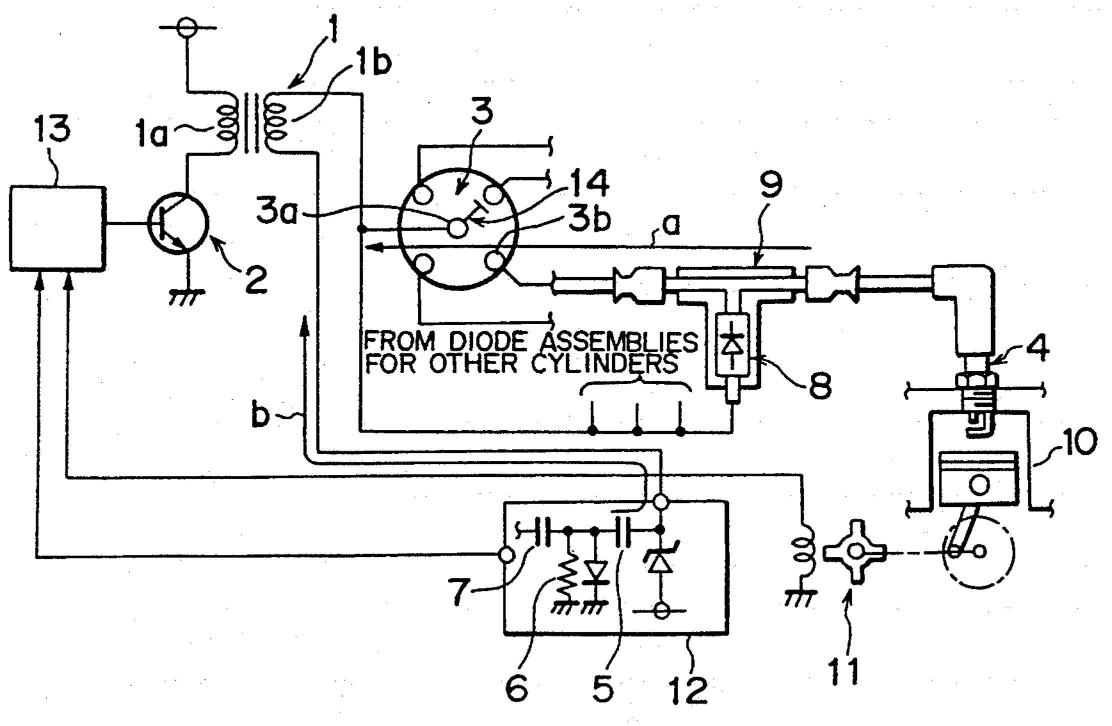
FIG. 17 is a block diagram showing the construction of a conventional internal-combustion-engine ignition device.

Embodiment of this invention will now be described with reference to the drawings. FIG. 1 is a block diagram showing the construction of an ignition device according to an embodiment of this invention; FIG. 2 is a plan view of a distributor cap; and FIG. 3 is a sectional view taken along line III—III of FIG. 2. The components which are the same as or equivalent to those shown in FIG. 17 are indicated by the same reference numerals, and a description of such components will be omitted. Referring to the drawings, numeral 31 indicates a distributor cap; and numeral 31*a* indicates four openings formed in the distributor cap 31 and angularly spaced apart from each other. Through each opening 31*a*, the tip section of a conductor insert 36, which is connected to an ignition plug 4, is exposed. Numeral 32 indicates a weld section connecting the insert 36 to a diode 8 supported by a diode support section 33; and numeral 37 indicates a filler section formed by filling the opening 31*a*, lodging the diode 8, with epoxy resin.

This internal-combustion-engine ignition device, constructed as described above, operates in the same manner as the above-described conventional device, so a description of its operation will be omitted. In this embodiment, the diodes 8 for detecting ion current are arranged inside the distributor cap 31, thereby making it possible to eliminate the diode assembly 9, which has been necessary for each cylinder in the conventional device. When mounting the diodes 8 in the distributor cap 31, each diode 8 is first placed on the diode support section 33 inside the opening 31*a*, and then the diode 8 and the insert 36 are welded together through the weld section 32. After that, the opening 31*a* is filled with epoxy resin to form the filler section 37.

Figure 4:
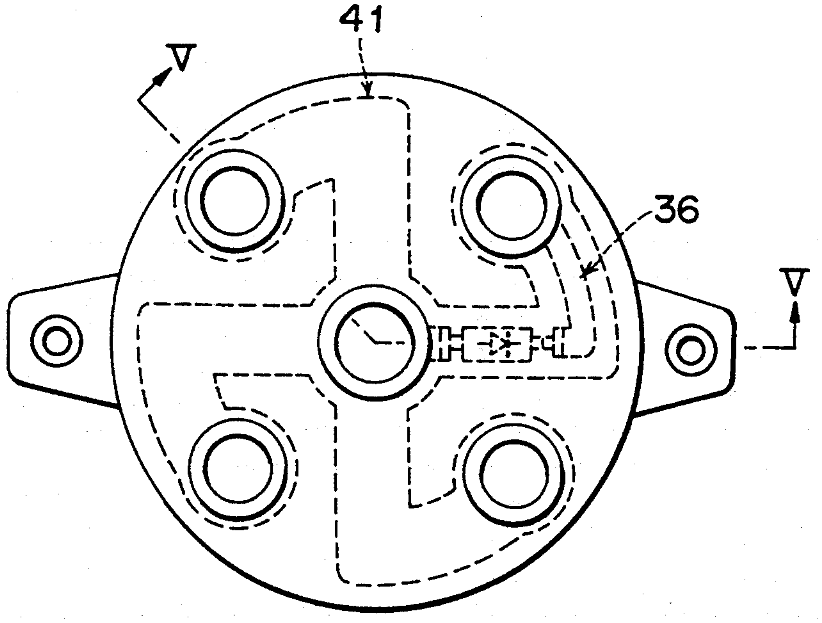
FIG. 4 Is a plan view of a distributor cap according to another embodiment of this invention.
Figure 5:
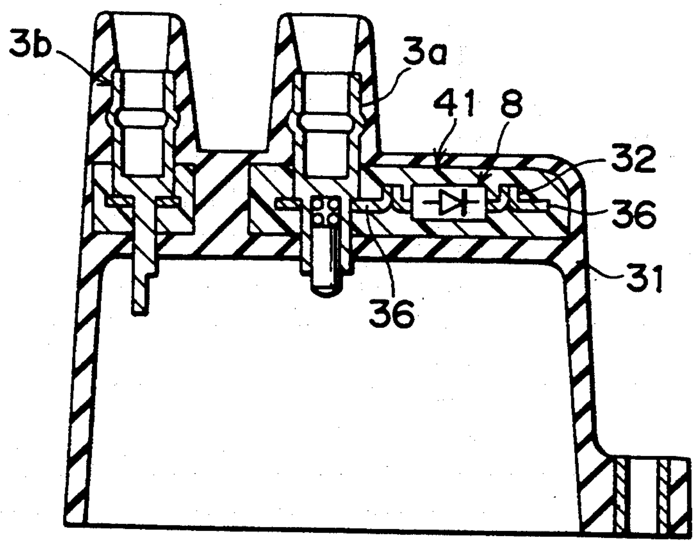
FIG. 5 is a sectional view taken along line V—V of FIG. 4.

FIG. 4 is a plan view of a distributor cap according to a second embodiment of this invention; and FIG. 5 is a sectional view taken along line V—V of FIG. 4. In this embodiment, the diodes 8, which respectively correspond to the associated cylinders, are connected to the inserts 36 beforehand, and are formed, together with the central electrode 3*a* and the peripheral electrodes 3*b*, into a premold 41 by primary molding using thermosetting resin, the pre-mold 41 being finally molded so as to form the distributor cap 31.

Figure 6:
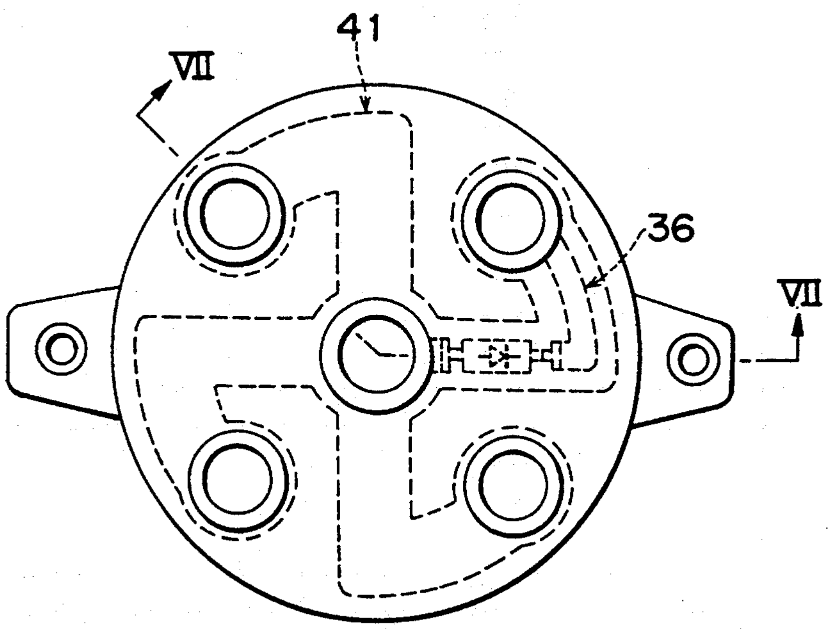
FIG. 6 is a plan view of a distributor cap according to still another embodiment of this invention.
Figure 7:
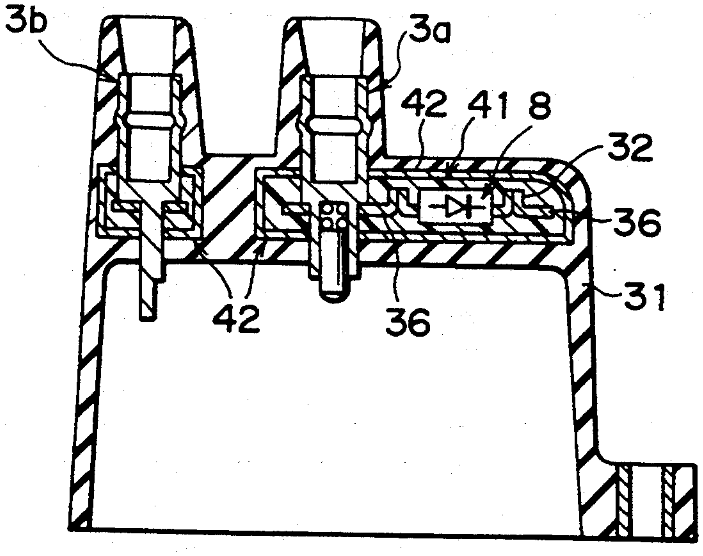
FIG. 7 is a sectional view taken along line VII—VII of FIG. 6.

FIG. 6 is a plan view of a distributor cap according to still another embodiment of this invention; and FIG. 7 is a sectional view taken along line VII—VII of FIG. 6. This embodiment differs from the second one in that an adhesive material 42, which serves as a current leakage preventing means, is applied to the surface of the pre-mold 41 of the second embodiment. Current leakage can also be prevented by roughening the surface of the pre-mold 41 by sand blasting or the like to increase the creeping distance, or by applying ultraviolet rays to the surface of the pre-mold 41 to improve the junction between the pre-mold 41 and the resin used in the final molding.

Figure 9:
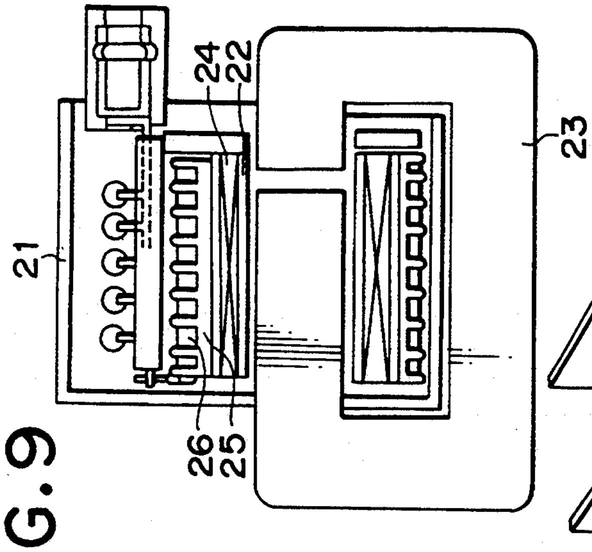
FIG. 9 is a sectional view of the ignition coil of FIG. 8.
Figure 8:
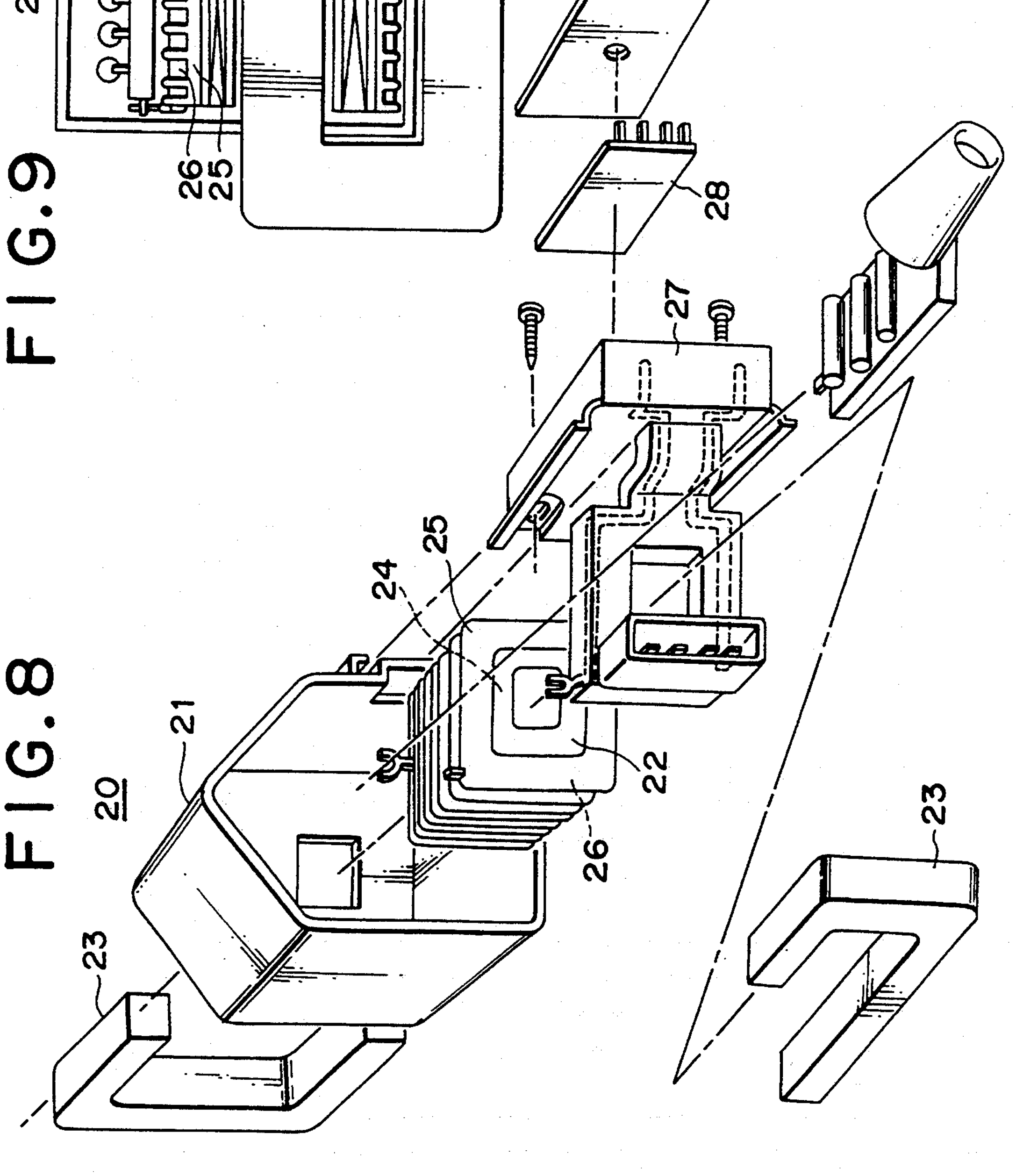
FIG. 8 is a perspective view of a structure according to an embodiment of this invention in which an ion-current-detection unit is arranged integrally with an ignition coil.

FIG. 8 is an exploded perspective view showing an ignition coil 20 for an internal-combustion-engine ignition device; and FIG. 9 is a sectional view of the essential parts of FIG. 8. In the drawings, numeral 21 indicates a case; numeral 22 indicates a primary bobbin arranged around an iron core 23; numeral 24 indicates a primary coil wound around the primary bobbin 22; numeral 25 indicates a secondary bobbin provided around the primary coil 24; numeral 26 indicates a secondary Toil wound around the secondary bobbin 25; numeral 27 indicates a cover which is detachable from the case 21; and numeral 28 indicates a hybrid IC (HIC) lodged in the cover 27 and corresponding to the ion-current detection unit 12 of the conventional device.

FIG. 10 is a perspective view of an ignition coil 30 according to another embodiment of this invention; FIG. 11 is an exploded perspective view of FIG. 10; and FIG. 12 is a sectional view of the essential parts of FIG. 11. Numeral 31 indicates a case; numeral 32 indicates a primary coil lodged in the case 31; numeral 33 indicates a secondary coil provided around the primary coil; numeral 34 indicates an iron core; numeral 35 indicates a connector; and numeral 36 indicates an ion current detector HIC provided inside the connector 35.

Figure 13:
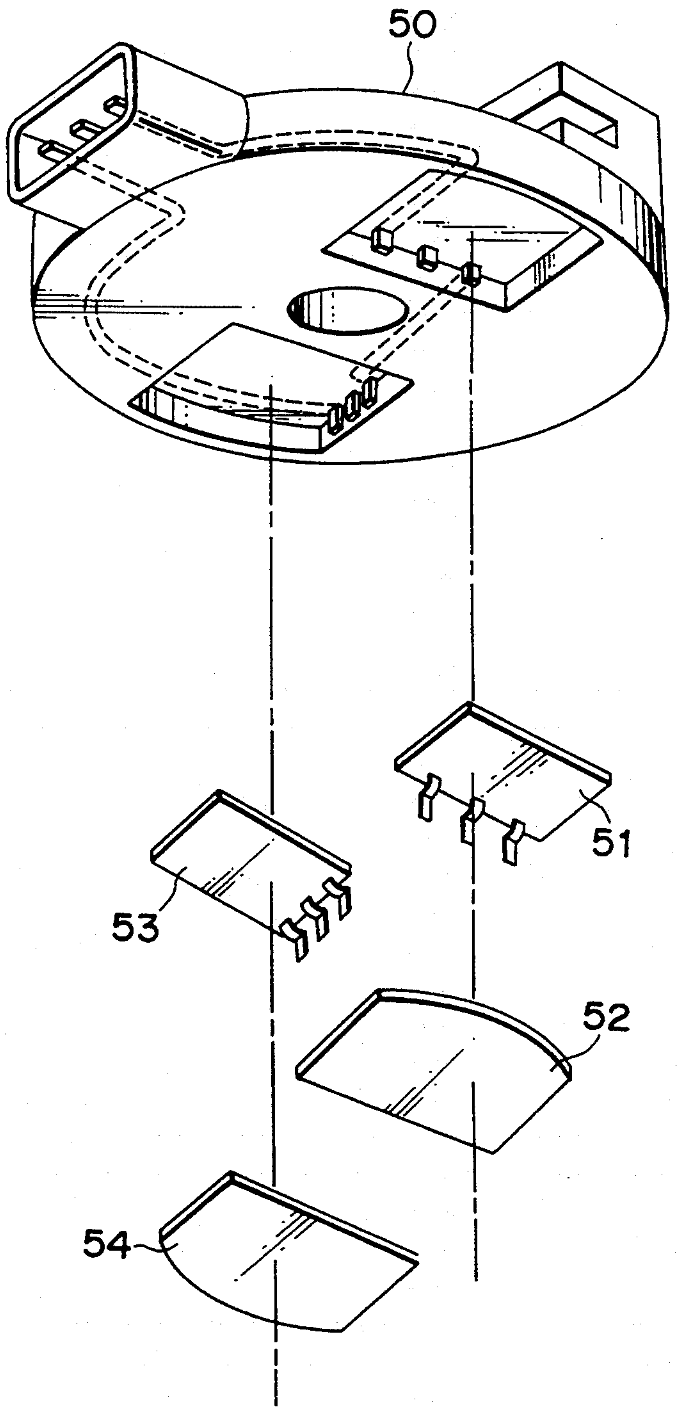
FIG. 13 is an exploded perspective view of a structure according to an embodiment of this invention in which an ion-current-detection unit is arranged integrally with a turning angle detecting unit.

FIG. 13 is an exploded perspective view of a turning-angle-detection unit 50 for an internal-combustion-engine ignition device according to still another embodiment of this invention. In the drawing, numeral 51 indicates an angle-detector HIC for detecting the turning angle of the rotating shaft (not shown) of the associated internal combustion engine; numeral 52 indicates a cover for tightly covering up the angle-detection HIC 51; numeral 53 indicates an ion-current-detector HIC provided within the angle-detection unit 50; and numeral 54 indicates a cover for tightly covering up the ion-current-detector HIC 53.

Figure 14:
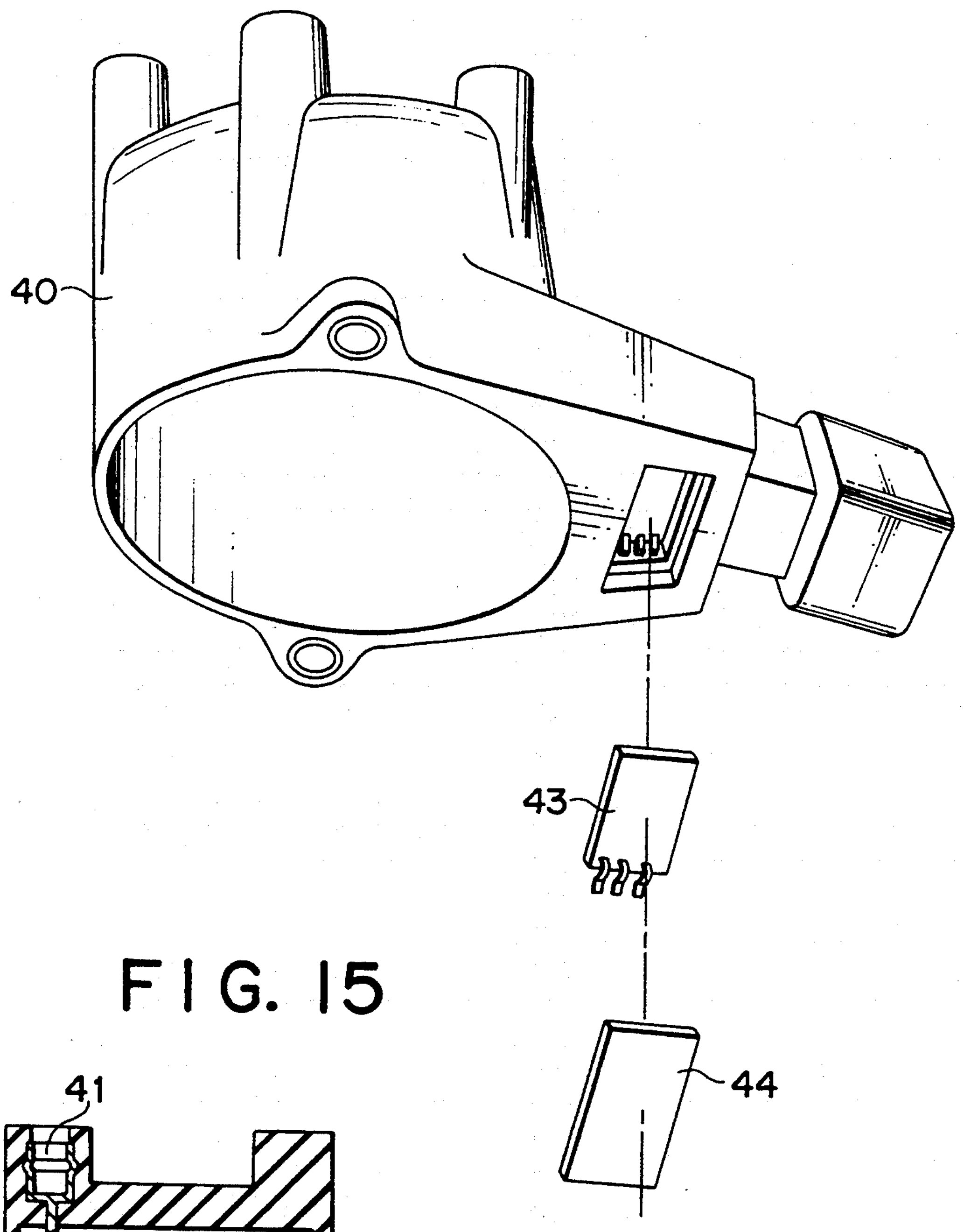
FIG. 14 is an exploded perspective view of a structure according to an embodiment of this invention in which an ion-current-detection unit is arranged integrally with a distributor cap.
Figure 15:
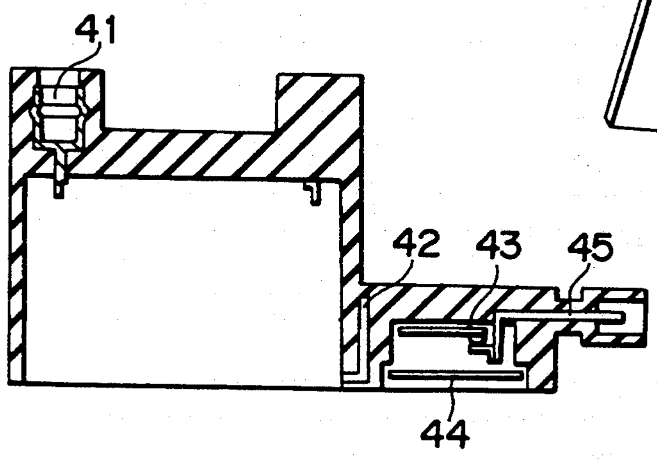
FIG. 15 is a sectional view of the distributor cap of FIG. 14.

FIG. 14 is an exploded perspective view showing a distributor cap 40 according to still another embodiment of this invention; and FIG. 15 is a sectional view of the essential parts of FIG. 14. In the drawings, numeral 41 indicates a peripheral electrode; numeral 42 indicates a shield plate; numeral 43 indicates an HIC provided within the distributor cap 40; numeral 44 indicates a cover for covering up the HIC 43; and numeral 45 indicates an inserted connector conductor.

Figure 16:
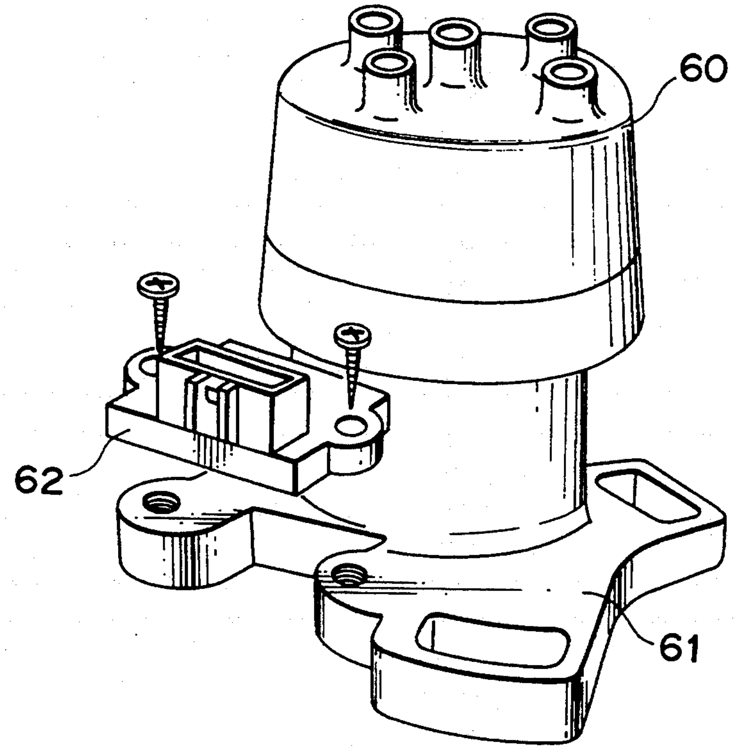
FIG. 16 is a perspective view of a structure according to an embodiment of this invention in which an ion-current-detection unit is arranged integrally with a distributor housing.

FIG. 16 is an exploded perspective view of a distributor 60 for an internal-combustion-engine ignition device according to a yet another embodiment of this invention. In the drawing, numeral 61 indicates a housing of the distributor 60; and numeral 62 indicates an ion-current-detection unit attached to the housing 61 and arranged within an ion-current-detector ion current detector HIC (not shown).

As described above, in the internal-combustion-engine ignition device of this invention, diodes are arranged in openings formed in a distributor cap, and are embedded in resin with which the openings are filled. The diodes, respectively corresponding to associated cylinders, may be connected to inserts beforehand, and form a pre-mold together with a central electrode and peripheral electrodes through primary molding using thermosetting resin, the pre-mold being finally formed into a distributor cap. Further, the pre-mold may have a current leakage preventing means on its surface. Due to these arrangements, it is possible to eliminate the diode assemblies which have been conventionally required, thereby reducing the number of parts, simplifying the device structure, and attaining a reduction in cost and an improvement in terms of layout and reliability.

Further, in the internal-combustion-engine ignition device of this invention, an ion-current-detection unit is attached to an ignition coil, a distributor cap, an angle-detection unit, or a distributor housing, whereby the ion-current-detection unit, which has been formed as a separate component, can be formed integrally with the ignition device, thereby reducing the number of parts, simplifying the structure, and attaining a reduction in cost and an improvement in terms of layout and reliability.

What is claimed is:

1. An internal-combustion-engine ignition device, comprising: a distributor including a central electrode connected to an ignition coil, and a plurality of peripheral electrodes respectively connected to ignition plugs of associated cylinders and adapted to be selectively connected to said central electrode; and an ion-current-detection unit for detecting an ion current generated upon combustion of an air-fuel mixture inside said cylinders, wherein said ion-current-detection unit is arranged integrally with another component of said internal-combustion-engine ignition device, and wherein said ion-current-detection unit is attached to said ignition coil.

* * * * *